United States Patent [19]

Groves

[11] Patent Number: 5,035,079
[45] Date of Patent: Jul. 30, 1991

[54] VEGETATION BARRIER INCORPORATING TEMPERATURE COMPENSATION

[75] Inventor: George D. Groves, Arnold, Mo.

[73] Assignee: B & G Consultants, Inc., Arnold, Mo.

[21] Appl. No.: 454,431

[22] Filed: Dec. 21, 1989

Related U.S. Application Data

[63] Continuation-in-part of Ser. No. 188,449, Apr. 29, 1988, Pat. No. 4,903,947, and a continuation-in-part of Ser. No. 418,480, Oct. 10, 1989, Pat. No. D 316,951.

[51] Int. Cl.$^5$ .................... A01G 1/00; E02D 27/00
[52] U.S. Cl. ............................... 47/33; 52/102; 52/105; 52/573; 256/1; 404/7
[58] Field of Search .................. 47/33; 256/32; 404/1, 404/7; 52/102, 105, 573

[56] References Cited

U.S. PATENT DOCUMENTS

| | | | |
|---|---|---|---|
| 2,187,087 | 1/1940 | Leary | 52/105 |
| 3,822,864 | 7/1974 | Keys . | |
| 4,125,964 | 11/1978 | Waggoner . | |
| 4,472,883 | 9/1984 | Ortega | 52/105 |
| 4,478,391 | 10/1984 | Kovach . | |
| 4,497,472 | 2/1985 | Johnson . | |
| 4,515,349 | 5/1985 | Groves . | |
| 4,548,388 | 10/1985 | Cobler . | |
| 4,595,175 | 6/1986 | Kauffman . | |
| 4,690,382 | 9/1987 | Koperdak . | |
| 4,831,776 | 5/1989 | Fritch | 47/33 |

Primary Examiner—Henry E. Raduazo
Attorney, Agent, or Firm—Paul M. Denk

[57] ABSTRACT

A vegetation barrier incorporating a base member, and upstanding leg, said base member extending to one or both sides of the upstanding leg, to fit underneath of a fence, at its lower end, and be affixed thereto, each barrier having a slot extending inwardly a fixed distance from one end between the upstanding leg and its base member, and temperature compensation structure designed into the barrier including either a series of apertures, arranged above the formed slot, and providing a means of stopping the extent of insertion of the next adjacent barrier therein, so as to provide additional clearance within the slot for expansion, by insertion of a stop within a temperature identified slot to limit the extent of insertion of the next adjacent barrier therein, or the temperature compensation means may include forming the barrier, either along its upstanding leg, or base member, or both, of a corrugated texture.

23 Claims, 1 Drawing Sheet

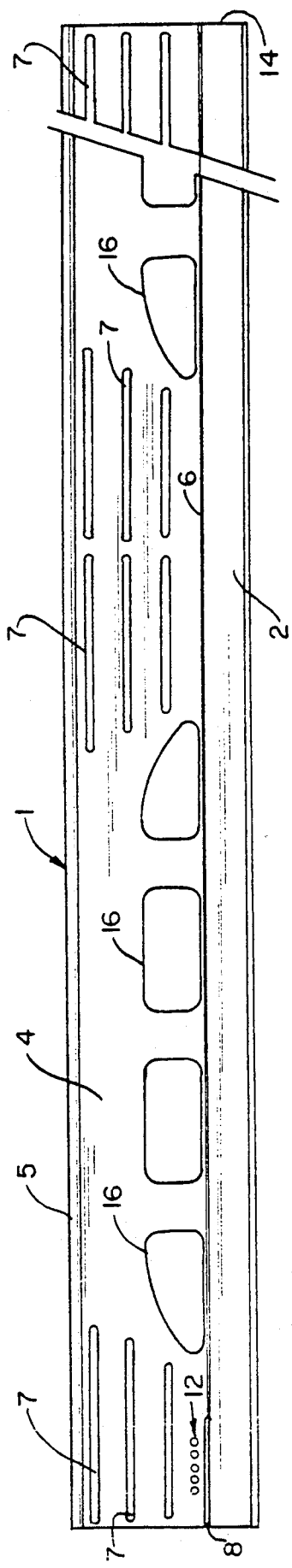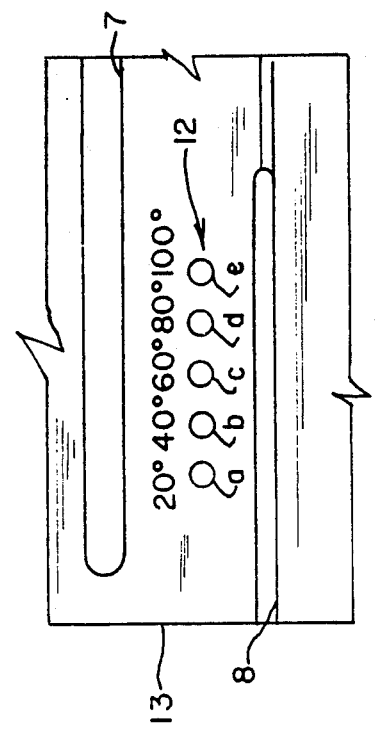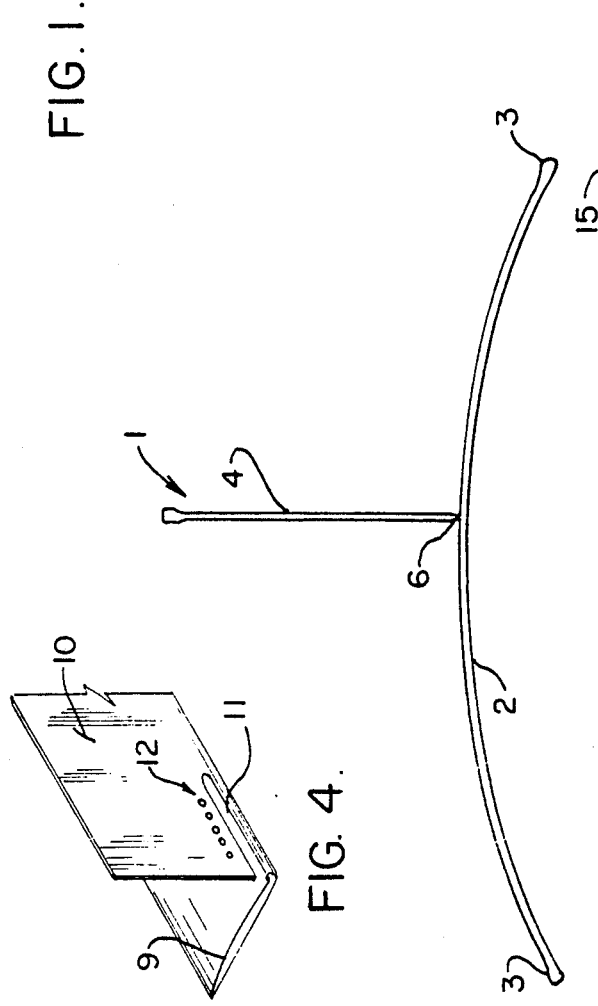
FIG. 1.
FIG. 2.
FIG. 3.
FIG. 4.
FIG. 5.

VEGETATION BARRIER INCORPORATING TEMPERATURE COMPENSATION

CROSS REFERENCE TO RELATED APPLICATION

This invention relates generally to, and comprises a continuation-in-part of the invention shown in my co-pending application having Ser. No. 07/188,449, filed on Apr. 29, 1988, now Pat. No. 4,903,947, and entitled "Fence or Other Structure Vegetation Barrier"; and this application also comprises a continuation-in-part of the design patent application entitled "Vegetation Barrier" filed on Oct. 10, 1989, under Ser. No. 07/418,480 and now Pat. No. D316,951; all of said inventions and applications being owned by a common entity.

BACKGROUND OF THE INVENTION

This invention relates generally to the provision of a vegetation guard or barrier, which is applied in proximity with a lower edge of fencing, or adjacent buildings or other structures, and thereby provide a means for eliminating the growth of any vegetation, grass, or weeds, at such locations, and wherein the barrier incorporates means for compensating for temperature expansion of its polymer components after applied for usage.

A variety of prior art devices, in the nature of weed barriers, are available in the art, and are being marketed. One such barrier is disclosed in my prior patent U.S. Pat. No. 4,515,349, identified as an "Integral Vegetation Barrier", and which is constructed, as can be noted, incorporating a base member, and upstanding leg, both of which are integral to each other, with the combination capable of being tied to the lower end of fencing, and thereby functioning as a means for eliminating grass or other weeds from generating at such location. My prior device likewise shows drainage openings, provided therethrough, in order to allow for the passage of any water, such as accumulated rain, therethrough and to prevent back up of moisture.

Other related types of vegetation barriers are disclosed in the prior patent to Niemann, No. 3,713,624, which shows a fence guard, for use for related purposes, to restrict the growth of grass, at the location of the vicinity at the bottom of a fence.

Other related patents showing similar type of structures are disclosed in the U.S. Pat. to Eccleston, No. 3,806,906, which shows a fence trim and vegetation barrier, and one which incorporates a rather extendable core member for connecting lengths of the barrier shells together, for interlocking purposes. The patent to Cowles, No. 3,768,780, shows another style of fence border. In addition, the patent to Abbe, No. 3,515,373, shows a related type of fence trim guard. The U.S. Pat. to Keys, No. 3,822,864, shows a related weed barrier for fencing. The U.S. Pat. to Wright, No. 3,393,897, shows various lengths of barrier for use under a fence, generally constructed incorporating cut-outs for facilitating the positioning of the barrier around the fence post. The U.S. Pat. to Snider, No. 4,349,989, shows another style of fence guard. The U.S. Pat. to Jensen, No. 3,545,127, discloses the usage of a lawn edging arrangement which incorporates leg members for embedding within the ground. The U.S. Pat. to Tisbo, No. 4,321,769, discloses another type of edging strip, which appears to be fabricated of a rubber or plastic. The U.S. Pat. to Hair, No. 4,219,941, shows another type of moisture barrier for a tray means.

The uniqueness of this current invention is to provide a vegetation barrier, which inherently incorporates means for providing compensation for temperature expansion or contraction of the generally polymer formed barrier means, so that once installed, it will remain intact, and not buckle, as a result of the effects of temperature upon the series of barriers once aligned and applied. The barrier incorporates the features of my prior inventions which includes means for interconnection of barrier lengths together, such that the ends of each length of the formed barrier provides for inserting the next adjacent length of the barrier therein, to the degree temperature compensation is effected as a result of gauging the length of insertion of the barriers together, when installed.

SUMMARY OF THE INVENTION

This invention contemplates the formation of a vegetation barrier, to various shapes, and which incorporates a base member, in all embodiments, and in select modifications, has an upstanding leg member integrally formed therewith and which projects a sufficient height to provide for interconnection of the vegetation barrier with the proximate fencing under which it is installed. In such embodiment, a tie means is useful for facilitating the permanent installation of the vegetation barrier to the lower end of a fence, for assuring its lasting connection.

In addition to the foregoing, the base member of the vegetation barrier may extend laterally, only to one side of its upstanding leg, or the base member may extend transversely to both sides, integrally, of the upstanding leg, to furnish the attributes of preventing weed and grass growth to either sides of the fence to which the barrier is installed.

In addition to the foregoing, in that embodiment where the vegetation barrier includes the upstanding leg integrally formed, as through extrusion molding, with its attached base member, there may be desirably provided a weakened groove or line at the point of intersection between the leg and the base member, in order to form a living hinge, to facilitate the fold over of said upstanding leg, and which provides for ease of storage or shipment. When the barrier is then installed, the upstanding leg will simply resiliently project upwardly, into its installation position, and ready for tying to the fence line. Generally, the upstanding leg and base members of this invention, being extruded from a polymer, normally have a thickness of approximately 0.070 to 0.080 inches, but at the location of the formed hinge line, it may be in the vicinity of 0.018 to 0.040, formed by a groove on one or both sides of the point of connection between the leg and the base member, to furnish that lineal line of weakening that facilitates the fold over of the upstanding leg, into proximity upon the base member.

In addition, the outer edges of the base member, and the upper edge of the upstanding leg, may be slightly increased in thickness, or beaded, in order to provide further reinforcement at these marginal locations for the components of this vegetation barrier.

Preferably, this invention is formed, as previously explained, of an extruded polymer, such as a polyolefin, or a polypropylene copolymers, and more specifically of polypropylene, or it may even be fabricated of a polyethylene, or polyurethane, during its fabrication.

Construction of the invention from an elastomer, such as a polyvinyl, may also be desirable. Obviously, other resins may be found useful for this intended purpose. Nevertheless, it is also desirable to add as an ingredient to the extruded material various inhibitors, such as one which strengthens the extruded polymer against ultraviolet rays, the latter which normally have a tendency, over a period of time, to make the resin rather brittle, and which leads to its premature cracking and deterioration. Such inhibitors have been found very useful when the extruded material may comprise polyethylene. Such materials for use as a resin extrudate, may be obtained from Himont U.S.A., Inc., of Wilmington, Delaware, and are normally sold under the trademarks and catalog numbers, Pro-Fax, No. 7723, and No. 7823. For example, the benzophenones are useful for absorbing ultraviolet light and converting it to a harmless form.

In addition, the various resins, such as the polyolefins, may be obtained from a company such as U.S.I. Chemicals, a division of National Distillers and Chemical Corp., located at Cincinnati, OH.

In the fabrication of the vegetation barrier, and when it is extruded, the base member is designed to be of a width of anywhere in the vicinity of three inches to six inches, and may even be extruded to a width of nine inches, or more. In any event, the base is designed to be of sufficient width to eliminate vegetation growth under or near the bottom of the fence, and likewise allows the ease of movement of at least a lateral segment of the lawnmower, thereupon, in order to provide cutting of any grass that is growing adjacent the emplaced barrier. Thus, it provides a very clean cut appearance to the fence, with no visible evidence of any weeds, grass or uncut growth, and in addition, does such without necessitating the need for the homeowner, or the like, of having to trim at such location, as currently required. Thus, usage of this invention therefore prevents the development of sore knees, or aching backs, to the yard man, or the homeowner, as we have all experienced, and furthermore, prevents the need for usage of any shears, and the incidence of cuts, abrasions, or blisters, as everyone has experienced.

There are three basic embodiments to the overall concept of this invention, with the variations of this invention enhancing the application and usage of the vegetation barrier of this design. One is to provide an inverted T-shaped appearing vegetation barrier, which, as previously explained, provides a base member, and an integrally upwardly extending leg. The second embodiment is an L-shaped member, with a single laterally extending base, connecting with an upstanding leg, which are generally designed for interfitting under the fence, and extending for some width, up to the approximate nine inch size, as previously explained. The base member of this invention is designed to be molded having an arcuate shape, or some convexity, along its width, in order to provide that its edges will be significantly biased against the ground, once installed, with the base member being generally flattened when placed into position, as when its upstanding leg is tied to the lower segment of the adjoining fence, as previously explained.

Another aspect of this invention, and which enters onto the concept of this current improvement is that the interlocking features provided between the various lengths of the vegetation barriers incorporate means for compensating for temperature. Normally, the lengths of these barriers may be extruded to six, eight, ten, or more feet in length. In the commercial embodiment of the invention, ten foot lengths are desired. But, when installing these lengths together, unless means is provided for furnishing continuity in the continuous length of the barrier, when emplaced, there is a likelihood that grass or weeds may grow at these junctures. Hence, interlocking means is provided at least at one end of each of the extruded barrier lengths. In these embodiments, incorporating upstanding legs, a slit or slot is provided between the upstanding leg and the base member, and extends inwardly of the barrier for some distance, approximately two or more inches, and provides clearance for insertion of the end of the next axially adjacent length or base member of the barrier, when installed. The next adjacent length simply has its base member slid into the slot of the just previously installed length of barrier, at its proximate end, and thereby provides an approximate two inch or more overlap between adjacent barriers, when installed. This can be continued indefinitely, to provide continuity in the application and laying of the barrier under any fencing material, as required.

Even in those particular embodiments where the barrier is formed of simply a base member, as shown in my prior applications, with no upstanding leg, a boss means is formed integrally extending downwardly from approximately the central end and inwardly of each barrier length, with the boss means extending for approximately four inches, more or less, or even substantially across thereof, and incorporates a slot within the boss member, adjacent the under surface of the contiguous base member, and that slot is designed for accommodating the insertion therein of the next axially aligned end of the length of the vegetation barrier being installed. The boss member is formed as an integrally depending ridge upon the underside of the base member, and in other embodiments, a pair of such ridges may be provided.

A unique feature of this current invention is the provision of means for providing temperature compensation. This may be achieved by two different methods, as designed by the inventor herein. One is to provide a series of empirically derived and located apertures within the upstanding leg of the barrier means, normally arranged horizontally or staggered above the formed base member slot, that accommodates the insertion of the next adjacent barrier means, when being installed. These apertures have been predetermined to provide an indication as to how far the next adjacent barrier should be inserted within the formed slot, so that, for example, when the barriers are being installed at a particular time of the year when the temperature is at a particular degree, a stop means may be temporarily inserted within one of said apertures that has been predetermined and gauged to provide that aperture corresponding to the ambient temperature to limit the extent in which the next adjacent barrier is to be inserted within the barrier means slot. Hence, when located up to that point, during its insertion, there will be adequate room for expansion or contraction of the barriers, relative to each other, when installed. Thus, as explained in our prior applications, wherein it was generally determined that the barrier means will be slid within their respective adjacent slots when installed, if, for example, the barrier means are being installed at a time of the year when the temperature may be reasonably chilly, such as, for example, at 40° F., and the barriers are installed together through insertion to their fullest extent within their adjacent slots, when the temperature elevates to a higher degree, as during mid-summer, as for example up to 100° F., their inch or more of expansion of each of the barriers will obviously cause a buckling in their installation under a fence. Hence, through usage of this current invention, wherein the barriers are predetermined to be inserted only up to a particular extent, within a slot, depending upon the temperature involved, this leaves adequate clearance for expansion, or contraction, of the various barriers, relative to each other, so as to eliminate any buckling, once installed.

Another aspect of the invention that may eliminate buckling of the various barriers, when installed, and provide compensation for temperature variation, is to form each of the barrier means, when molded, into a corrugated shape, and therein furnish some means for expansion or contraction, due to the bellows-like texture of their inherent construction.

Other features of this invention, as summarized herein, and as incorporated from my prior applications, include the usage of spike means for additionally affixing the vegetation barrier to the ground, particularly where the barrier may include only a base means, without an upstanding integral leg. In addition, drainage means may be designed into the construction of the vegetation barrier, as previously reviewed, and normally these drainage means may include a series of apertures, or vent type holes, which are generally punched from the upstanding leg after it has been molded, so as to facilitate the flow of any rain or other water therethrough, generally in the vicinity where the upstanding leg integrally forms with the base member. Yet, this still provides maximum strength to the formed vegetation barrier, while further affording the advantages of drainage, as may be required depending upon the contours of the ground upon which the barrier is installed. Furthermore, as previously reviewed in earlier applications, various cut-outs may be provided at predetermined locations along the length of the barrier means, so as to facilitate its installation around fence posts, or the like.

Hence, a principal object of this invention is to provide for the fabrication of a series of lengths of barrier means, for use for retarding the growth of vegetation under a fence, or the like, and which barrier means inherently incorporate provisions for compensation for temperature variation during the usage, installation, and application of the vegetation barrier for its intended purposes, particularly within regions where the temperatures of the climate may vary substantially from season-to-season.

Another object of this invention is to provide lengths of a vegetation barrier that can be easily installed by the service man in the minimum of time under a fence line.

Still another object of this invention is to provide lengths of polymer extruded vegetation barrier, formed of various polymers, and which further include inhibitors so as to prevent the effects of ultraviolet rays, or the like, when installed for any considerable length of time outdoors.

Still another object of this invention is to provide means for compensating for temperature variations within a constructed vegetation barrier.

Yet another object of this invention is to provide a series of empirically derived apertures within each vegetation barrier so as to function as a gauge for determining the extent that adjacent lengths of barrier may be installed together, depending upon the approximate ambient temperature on the date of their installation.

Still another object of this invention is to provide a vegetation barrier which is fabricated to a corrugated shape.

Another object of this invention is to provide a vegetation barrier constructed in the manner as previously reviewed, and which incorporates various other openings, either for drainage, or for interconnecting with fencing material, and tie means, to provide for the permanent installation and application of a series of lengths of barriers together for usage.

Still another object of this invention is to provide a vegetation barrier, which when installed prevents the growth of grass or weeds in the vicinity of the fence, and thereby gives the yard in which the barrier is located a rather clean cut and well groomed appearance.

Still another object of this invention is to provide a vegetation barrier which eliminates the need for trimming of the grass around the fence when installed.

These and other objects will become more apparent to those skilled in the art upon reviewing this summary of the invention, and upon undertaking a study of the description of its preferred embodiment, in view of the drawings.

BRIEF DESCRIPTION OF THE DRAWINGS

In referring to the drawings, FIG. 1 provides a front view of a length of the vegetation barrier with expansion compensation embodying the concept of this invention, partially broken away, where noted;

FIG. 2 is an enlarged view of the approximate left end of the vegetation barrier shown in FIG. 1, disclosing the temperature compensation means embodied within its structure;

FIG. 3 is a left end view thereof;

FIG. 4 is an isometric view of a modification to the vegetation barrier of this invention, incorporating its expansion compensation means, and disclosing a base member which extends laterally only to one side of its upstanding leg; and FIG. 5 provides a plan view of a modification to the vegetation barrier of this invention disclosing its upstanding leg being fabricated into a corrugated configuration.

DESCRIPTION OF THE PREFERRED EMBODIMENT

In referring to the drawings, and in particular FIG. 1, the vegetation barrier 1 of this invention is accurately disclosed, and it normally will be located, in addition to aligned further lengths of the barrier, under the lower end of a proximate fence (not shown), in the manner as previously reviewed and disclosed in my prior applications. The barrier of this invention, as also seen in FIG. 2 includes a base member 2, which is fabricated of the materials as previously described, and which is formed of arcuate or convex shape, allowing for its beaded edges 3 to rest firmly upon the ground, when installed. Extending integrally upwardly from the approximate central part, or slightly adjacent thereof, of the base member 2 is an upstanding leg 4, which may likewise include a bead, or enlarged portion, as at 5, along its upper edge, for reinforcement purposes. As previously described, a weakened line of integral connection, as approximately at 6, is provided along the length of each section of barrier, either on one or both sides thereof, and form grooves thereat, at the location of the leg connection with the upper surface of the base member, to form a living hinge, for the purposes as previously explained.

As previously explained in earlier applications, various lengths of these vegetation barriers are axially adjoined together, or interconnected together, so as to provide a continuous length form of barrier, when installed, under fencing which may be of substantial length. Furthermore, as previously explained, once installed, the barrier interconnects with its fencing, as by attachment by means of any tie means to the fencing material, and the tie means may insert through various slots, as at 7, and linked through the fencing, so as to provide reasonable securement of the barrier means to the fence, but due to the length of the slots 7, allows for the barrier to contract or expand, when subjected to temperature variations.

As also previously explained, various lengths of the barriers achieve their interfitting together, with each length of a barrier having a slot, formed as at 8, adjacent one end. This can also be seen in FIG. 3. These slots are formed proximate one end, and extend inwardly at the location between the upright leg 4, and the base member 2, so that the opposite end of each next adjacent length of barrier will be disposed for sliding insertion into the slot, and provide an overlapping of the length ends, as they are installed in alignment together, in the manner as previously explained, to form a continuous barrier.

The embodiment for the invention as shown and explained in FIGS. 1 through 3, as noted, includes a base member 2 that extends laterally to either side of the upstanding leg 4. But, as can be seen in FIG. 4, it is just as likely that the vegetation barriers may include a base member that extends laterally, as at 9, only to one side of its upstanding leg 10. Thus, this type of barrier means may be located adjacent a building structure, or along one side of a fence, or the like, and extend its lateral leg 9 outwardly, over the grass, so as to prevent the growth of vegetation in proximity of the building, and allow the, for example, lawn mower wheel to ride upon the base 9, when cutting of grass. In addition, as can be noted, the singular slot 11 extends inwardly for some distance, from the proximate end of the barrier, as shown, so as to accommodate the sliding insertion of the next adjacent barrier therein, when a series of them are linked together in alignment for extension of the full length of any fence or building, against which the barriers are being installed.

The significant aspect of this invention is to provide for temperature compensation, or allow for expansion, between the various linked vegetation barriers once installed. To achieve this, the invention includes a series of apertures, as at 12, generally arranged in alignment overlying the formed slots 8 or 11, for both embodiments of the barrier as shown. Referring more specifically to FIG. 3, identifying indicia is also provided arranged above each of the formed apertures. Each of these apertures are formed of approximately 0.125 inches in diameter, although slightly larger or smaller dimensions may still suffice for the purposes of this invention. And, it has been empirically determined, particularly where the lengths of vegetation barrier of this invention are formed of a polyolefin, that locating of these apertures at particular distances, relative to the end edge 13 of the barrier, provides a gauge for determining the extent and depth of insertion of the next adjacent length of barrier member, when inserted within the slots 8 or 11, when installed together. For example, the initial aperture A is arranged, and has been empirically determined, to be disposed approximately three-quarter inch, on center, from the end edge 13 of the barrier means. The next adjacent apertures B through E are each spaced approximately a quarter inch apart, and each aperture is designated with a temperature gauge provided thereabove, as noted in FIG. 3. Hence, when the barrier means are being linked together, through insertion of the next adjacent end, something equivalent of the end 14 as shown, into the slot 8 of the previously installed barrier member, if for example, the barrier means are being installed when the ambient temperature is approximately 20° F., a stop means, such as a peg or nail, will be inserted through the aperture a, to thereby limit the extent of insertion of the next adjacent barrier, up to that point, when being installed together. And, if the ambient temperature is at 40° F., 60° F., 80° F., or 100° F., as noted, then the stop means will be inserted within that particular aperture, so as to limit the extent of insertion of the next adjacent barrier means within the slot 8, or 11, when the barrier members are being interfitted in alignment. Hence, as is well known, since polymers may generally expand as much as two to three inches, over ten foot lengths, when temperature elevates from freezing to approximately 160° F., as previously explained, if these barrier members are installed together, up to the fullest extent of insertion within the slot 8, when the temperature rises, to any degree, buckling of the aligned barrier members will occur. But, to limit the extent of insertion up to the aperture designated to a particular degree, then variations in temperature, generally through expansion, or even contraction, is compensated for through the development and application of the empirically derived apertures, at their arranged locations, as shown at 12, when provided within a barrier member as disclosed, to the dimensions as stated, so that when the next adjacent length the barrier is inserted therein, if any significant expansion occurs, there is yet ample room within the clearance slot 8, to accommodate such expansion.

Another variation upon this invention, as shown in FIG. 5, and which is designed to provide for compensation for temperature variation, is to fabricate the barrier member, either in its upstanding leg 14, or its base member 15, or both, to a corrugated configuration, as shown, so as to provide for some compensation for expansion or contraction, by means of the corrugated feature, and alleviate the stresses developed due to expansion, or contraction, when a series of these barrier members are linked together, within their formed slots 8 or 11, as previously explained.

Other features, as previously reviewed in earlier applications, such as the provision of drainage openings, as at 16, may be provided at spaced locations along the length of the upstanding leg, and generally arranged in proximity with the upper surface of the base member 2, so that as water or moisture accumulates to one side of the barrier, it will be allowed to freely flow through such openings, and not be retarded in passage. Furthermore, various types of tie means, whether fabricated of polymer themselves, or of other materials, may be used for tying this vegetation barrier to the lower end of a fence, in the manner as previously explained.

Variations or modifications to the vegetation barrier of this invention, as described herein, may occur to those skilled in the art upon reviewing the subject matter of this disclosure. Such variations or modifications, if within the spirit of this invention, are intended to be encompassed within the scope of any claims to patent protection issuing upon this development. The description of the preferred embodiment set forth herein is done so for illustrative purposes only.

Having thus described the invention what is claimed and desired to be secured by Letters Patent is:

1. A length of vegetation barrier for use under a fence and for eliminating the growth of grass, weeds, and the like, in the vicinity of the lower edge of such fencing, or other structures, and wherein a series of such length of barriers are longitudinally connected end-to-end to firm a continuous vegetation barrier under such fencing, comprising, a base member provided for locating under the lower edge of such fencing, and upon the ground, said base member having a width for extending laterally to at least one side of the fence to allow clearance for any lawn mower or other cutter to at least partially override thereon during lawn trimming, said base member having an upper surface therefor, an upstanding leg integrally formed and extending upwardly for the length of said base member, said upstanding leg extending upwardly for a distance to allow for its fixation to a fence, an interlocking means provided at least at one end of each length of barrier for connection end-to-end with the next adjacent length of barrier, said interlocking means comprising there being an open ended slot provided proximate the location of connecting of the upstanding leg with the base member for the barrier, and said slot extending into the barrier a fixed distance from one end thereof, said slot having a height approximating the thickness of the base member and provided for accommodating the insertion of the end of the next adjacent length of barrier for providing an interlocking of a series of lengths of vegetation barriers together, said interlocking ends of the adjacent lengths of barriers overlapping to provide continuity of coverage in the functioning of the installed barrier for overlying the vegetation throughout the length of the fence to which it attaches, and temperature gauging means provided above said formed slot for limiting the extent of insertion of the next adjacent length of barrier into the next barrier slot to provide space for temperature expansion or contraction after the vegetation barrier has been installed.

2. The invention of claim 1 and wherein said gauging means comprising a series of apertures formed through the upstanding leg and arranged above the formed slot and into which a stop means may be inserted to limit the extent of insertion of the next adjacent barrier into the barrier slot to compensate for temperature variations and the expansion or contraction of the barriers when installed.

3. The invention of claim 2 and wherein said series of apertures being horizontally aligned above each barrier slot.

4. The invention of claim 3 and wherein said base member extending laterally to either side of the upstanding leg.

5. The invention of claim 4 and wherein said base member being convexly formed transversely along its width to provide for the substantially flush mounting of the vegetation barrier upon the ground.

6. The invention of claim 5 and wherein said upstanding leg having at least one additional aperture provided therethrough to facilitate the attachment of said barrier to any associated fence or other structure.

7. The invention of claim 6 and including a series of apertures provided through said upstanding leg to accommodate the attachment of tie mean to facilitate the securement of the barrier to any associated fence.

8. The invention of claim 7 and including at least one drainage hole opening provided through the upstanding leg to allow rain, water, or the like, to flow past the barrier.

9. The invention of claim 8 and wherein there being a series of drain openings provided through the upstanding leg and spaced along the length of said leg.

10. The invention of claim 9 and wherein select of said drain openings being widened at its bottom edge to facilitate the flow of water therethrough.

11. The invention of claim 10 and including a weakening groove provided along the upstanding leg at the region of its integral connection with the base member to furnish a living hinge for facilitating the folding over of the leg upon the said base member to facilitate its shipment and storage.

12. The invention of claim 1 and wherein said barrier being formed of a polymer.

13. The invention of claim 12 and wherein said polymer comprising polyolefin.

14. The invention of claim 1 and including a tie means securing said upstanding leg of the fence.

15. The invention of claim 1 and wherein said upstanding leg being corrugated along its length.

16. The invention of claim 1 and wherein said base member being corrugated along its length.

17. The invention of claim 1 and wherein said upstanding leg and base member being corrugated along their length.

18. The invention of claim 12 and wherein said polymer including an ultraviolet ray inhibitor.

19. The invention of claim 12 and wherein said polymer comprising polyproylene ethylene.

20. The invention of claim 12 and wherein said polymer comprising polyethylene.

21. The invention of claim 12 and wherein said polymer comprising polypropylene copolymer.

22. The invention of claim 12 and wherein said polymer comprising polyurethane.

23. The invention of claim 1 and wherein said base member extending laterally to one side of said upstanding leg.

* * * * *

UNITED STATES PATENT AND TRADEMARK OFFICE
CERTIFICATE OF CORRECTION

PATENT NO. : 5,035,079

DATED : July 30, 1991

INVENTOR(S) : George D. Groves

It is certified that error appears in the above-identified patent and that said Letters Patent is hereby corrected as shown below:

In the Abstract, line 10, change "means of stopping" to ---means for stopping---.

Claim 1, column 9, line 13, change "firm" to ---form---; line 29, change "connecting" to ---connection---.

Signed and Sealed this

First Day of December, 1992

Attest:

DOUGLAS B. COMER

Attesting Officer

Acting Commissioner of Patents and Trademarks